(12) United States Patent
Chen et al.

(10) Patent No.: US 7,558,055 B2
(45) Date of Patent: Jul. 7, 2009

(54) RETAINING APPARATUS FOR EXPANSION CARD

(75) Inventors: Yun-Lung Chen, Shenzhen (CN); Da-Long Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 364 days.

(21) Appl. No.: 11/308,947

(22) Filed: May 29, 2006

(65) Prior Publication Data
US 2007/0177341 A1    Aug. 2, 2007

(30) Foreign Application Priority Data
Dec. 30, 2005    (CN) .................. 2005 2 0121454 U

(51) Int. Cl.
*G06F 1/16* (2006.01)
(52) U.S. Cl. .............................. 361/679.32; 361/679.02
(58) Field of Classification Search ................. 361/683, 361/788, 801
See application file for complete search history.

(56) References Cited

U.S. PATENT DOCUMENTS

| | | | |
|---|---|---|---|
| 5,936,835 A | 8/1999 | Astier | |
| 6,160,712 A * | 12/2000 | Itai et al. | 361/801 |
| 6,182,835 B1 * | 2/2001 | Chen | 361/726 |
| 6,231,139 B1 * | 5/2001 | Chen | 361/788 |
| 6,278,614 B1 * | 8/2001 | Beaman et al. | 361/801 |
| 6,530,629 B2 * | 3/2003 | Shyr | 312/223.2 |
| 6,618,263 B1 * | 9/2003 | Kin-Wing et al. | 361/801 |
| 6,639,151 B1 * | 10/2003 | Chen et al. | 361/683 |
| 6,704,205 B1 * | 3/2004 | Chen | 361/801 |
| 6,834,766 B2 * | 12/2004 | Lin et al. | 361/683 |
| 6,853,549 B2 * | 2/2005 | Xu | 361/685 |
| 7,161,798 B2 * | 1/2007 | Chen et al. | 361/683 |
| 2001/0053060 A1 * | 12/2001 | Gan | 361/683 |
| 2004/0125550 A1 * | 7/2004 | Lin et al. | 361/683 |
| 2004/0179333 A1 * | 9/2004 | Xu | 361/685 |

* cited by examiner

*Primary Examiner*—Jayprakash N Gandhi
*Assistant Examiner*—Adrian S Wilson
(74) *Attorney, Agent, or Firm*—Wei Te Chung

(57) ABSTRACT

An expansion card assembly includes a panel (10), an expansion card (100), a retaining member (30), and a holding member (50). The panel defines a fixing slot (11) therein. A supporting clip (15) bent from the panel. The expansion card with a fixing clip thereon is received in the fixing slot of the panel. The retaining member is attached to the panel. The retaining member includes a pressing portion (31) and a side wall (33). The side wall has a catch (35) thereon. The resilient holding member is attached to the panel. The holding member includes an engaging portion. When the retaining member abuts against the panel, the catch urges the engaging portion to deform, thereby the catch engaging with the engaging portion when the engaging portion rebounds.

17 Claims, 6 Drawing Sheets

RETAINING APPARATUS FOR EXPANSION CARD

FIELD OF THE INVENTION

The present invention relates to retaining apparatuses, and more particularly to a retaining apparatus for readily and firmly retaining an expansion card in a computer enclosure.

DESCRIPTION OF RELATED ART

To enhance the function of computer, a plurality of removable expansion cards is used in a computer enclosure, such as, network cards, video cards and so on. A plurality of slots is provided for receiving these expansion cards in the computer enclosure for communicating with other relative devices.

A common means for retaining the expansion cards in the slots of the computer is by screws. For example, a clamping lever arrangement is provided, which can be fastened by an external screw to clamp in position one or more expansion cards in the housing. In one arrangement, the clamping lever is provided with four fingers that pass through respective apertures in the computer housing. Each finger serves to clamp into position a respective expansion card, or blanking plate if no card is present. Thus a single clamping lever with a single external fixing screw replaces the standard usage of a respective fixing screw for each card. However, securing the screw into the computer is laborious and time-consuming. A tool such as a screwdriver is usually used.

What is needed, therefore, is to provide a retaining apparatus, which allows convenient retention of expansion cards into a computer without using any additional detachable securing devices.

SUMMARY OF INVENTION

An expansion card assembly includes a panel, an expansion card, a retaining member, and a holding member. The panel defines a fixing slot therein. A supporting clip bent from the panel. The expansion card with a fixing clip thereon is received in the fixing slot of the panel. The retaining member is attached to the panel. The retaining member includes a pressing portion and a side wall. The side wall has a catch thereon. The resilient holding member is attached to the panel. The holding member includes an engaging portion. When the retaining member abuts against the panel, the catch urges the engaging portion to deform, thereby the catch engaging with the engaging portion when the engaging portion rebounds.

Other advantages and novel features will be drawn from the following detailed description of a preferred embodiment with attached drawings, in which:

DETAILED DESCRIPTION

Figure 1:
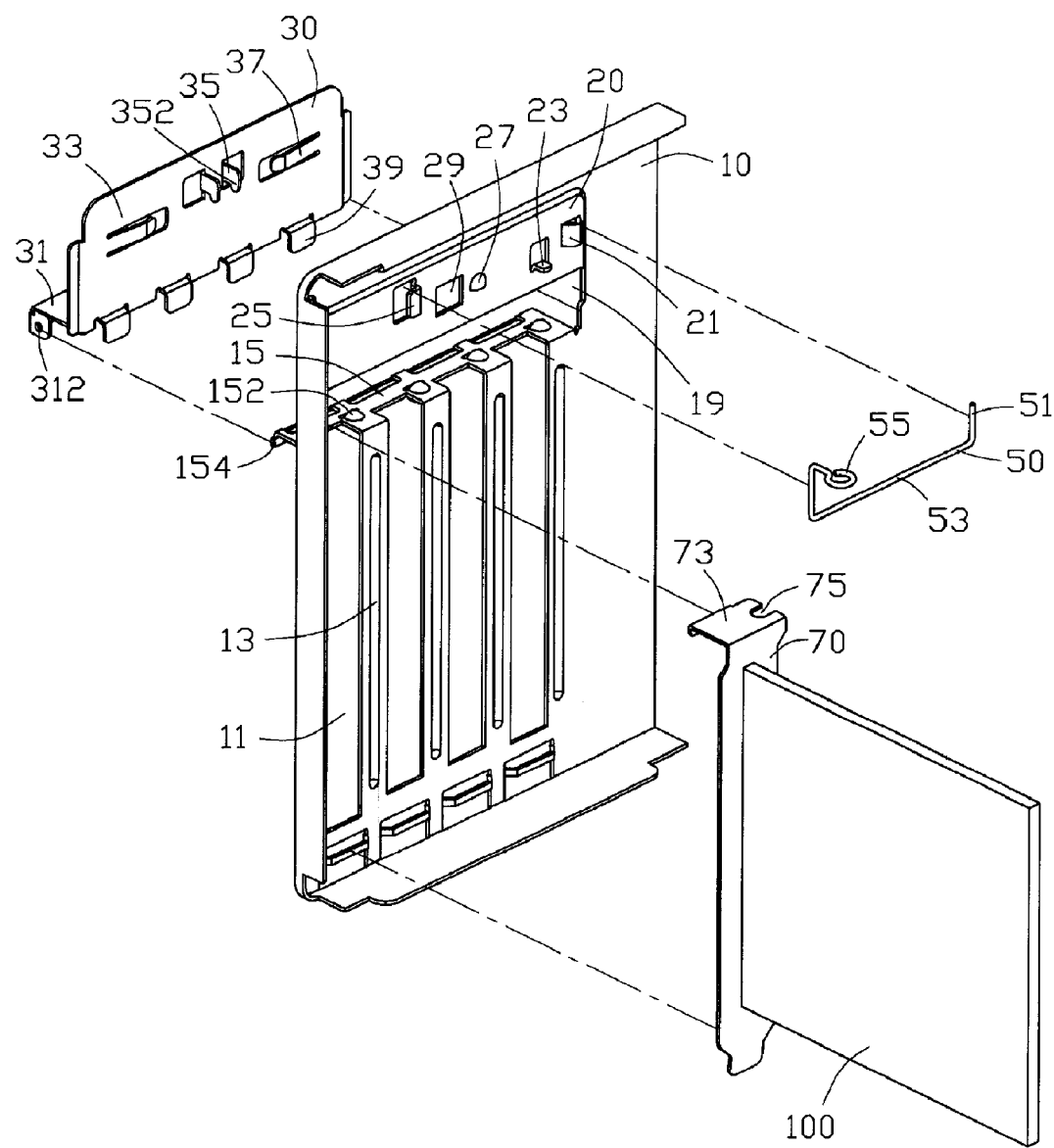
FIG. 1 is an exploded, isometric view of a retaining assembly for expansion cards of a preferred embodiment of the present invention, the retaining apparatus including a rear panel, a retaining member, an expansion card, and a holding member.

Referring to FIG. 1, a retaining apparatus for securing a plurality of card-like components, for example, expansion cards 100, into an electronic device like a computer includes a rear panel 10, a retaining member 30, and a holding member 50.

The rear panel 10 defines a plurality of evenly spaced vertical fixing slots 11. Every two adjacent fixing slots 11 are divided by a barrier 13. A top portion of each barrier 13 is bent horizontally to form a supporting clip 15, and define a through opening 19 thereabove in the rear panel 10. A positioning tab 152 is formed on the supporting clip 15 above each barrier 13. A pivot axis 154 is formed from end to end of an outer edge of the supporting clip 15. A securing board 20 is formed above the through opening 19 in the rear panel 10. A holding tab 21 with a through hole therein protrudes from the securing board 20 for holding the holding member 50. A tab 23 is bent in on the securing board 20 adjacent the holding tab 21. A protrusion 27 is formed on a middle portion of the securing board 20. A rectangular securing opening 29 is defined near the protrusion 27. A restricting hook 25 with a free end pointing generally away from the securing opening 29 is formed in on the securing board 20.

The expansion card 100 has an L-shaped fixing clip 70. A top flange 73 is bent horizontally on the fixing clip 70. A cutout 75 is defined in the top flange 73 corresponding to the positioning tab 152 of the rear panel 10.

The retaining member 30 includes a pressing portion 31 and a side wall 33. The side wall 33 extending vertically from a side of the pressing portion 31. A pivot portion 312 extends from each of two opposite sides of the pressing portion 31 corresponding to ends of the pivot axis 154 of the rear panel 10. Each pivot portion 312 defines a pivot hole. A plurality of fingers 39 are bent vertically down from the pressing portion 31 adjacent to the side wall 33 corresponding to the barriers 13 of the rear panel 10 for holding the fixing clip 70. A pair of catches 35 is formed perpendicular to the side wall 33. An arcuate hook end 352 of each catch 35 generally points down. A pair of resilient clips 37 is formed near the catches 35 with resilient ends pointing inward toward the rear panel 10.

The holding member 50 is formed of a resilient iron wire, and includes a resilient engaging portion 53, a securing end 51 which is bent from a distal end of the engaging portion 53, and an L-shaped operating portion 55 bending from another distal end of the engaging portion 53.

Figure 2:
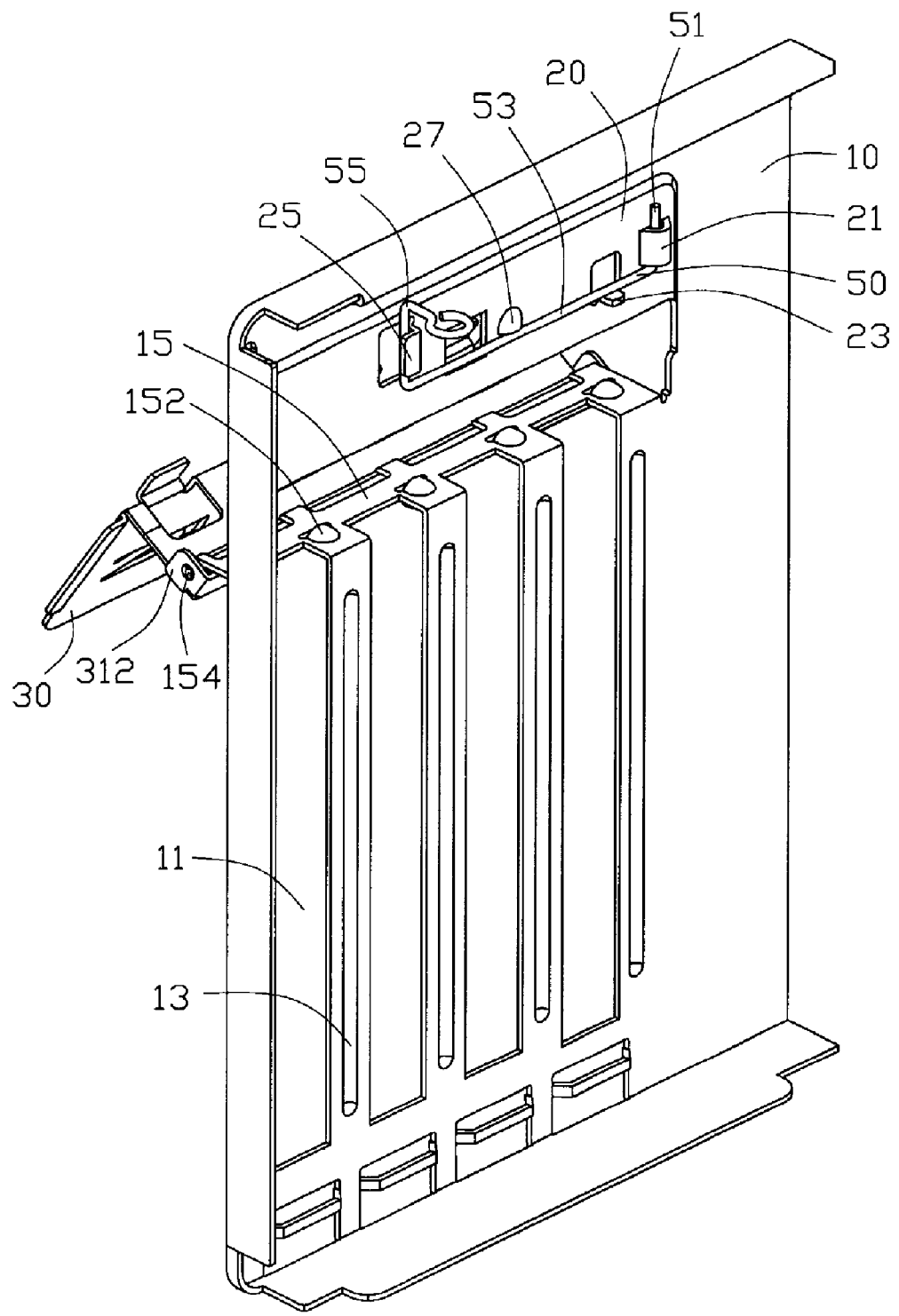
FIG. 2 is an assembled, isometric view of the retaining assembly of FIG. 1 without the expansion card.

Referring also to FIG. 2, in assembling the retaining member 30 and the holding member 50 to the rear panel 10, the ends of the pivot axis 154 of the rear panel 10 are respectively received in the corresponding pivot holes of the retaining member 30. Then, the retaining member 30 is ready to be pivoted to the rear panel 10. The securing end 51 of the holding member 50 is received in the holding tab 21 of the rear board 20. The engaging portion 53 is positioned on the tab 23, and is blocked below the protrusion 27 of the rear panel 10. The operating portion 55 is held in the restricting hook 25 of the rear panel 10.

In assembling the expansion card 100 to the rear panel 10, the fixing clip 70 of the card 100 is secured to one of the fixing slots 11 of the rear panel 10. The top flange 73 of the fixing clip 70 abuts against the supporting clip 15 of the rear panel 10. The positioning tab 152 is accommodated in the cutout 75 of the fixing clip 70.

Figure 3:
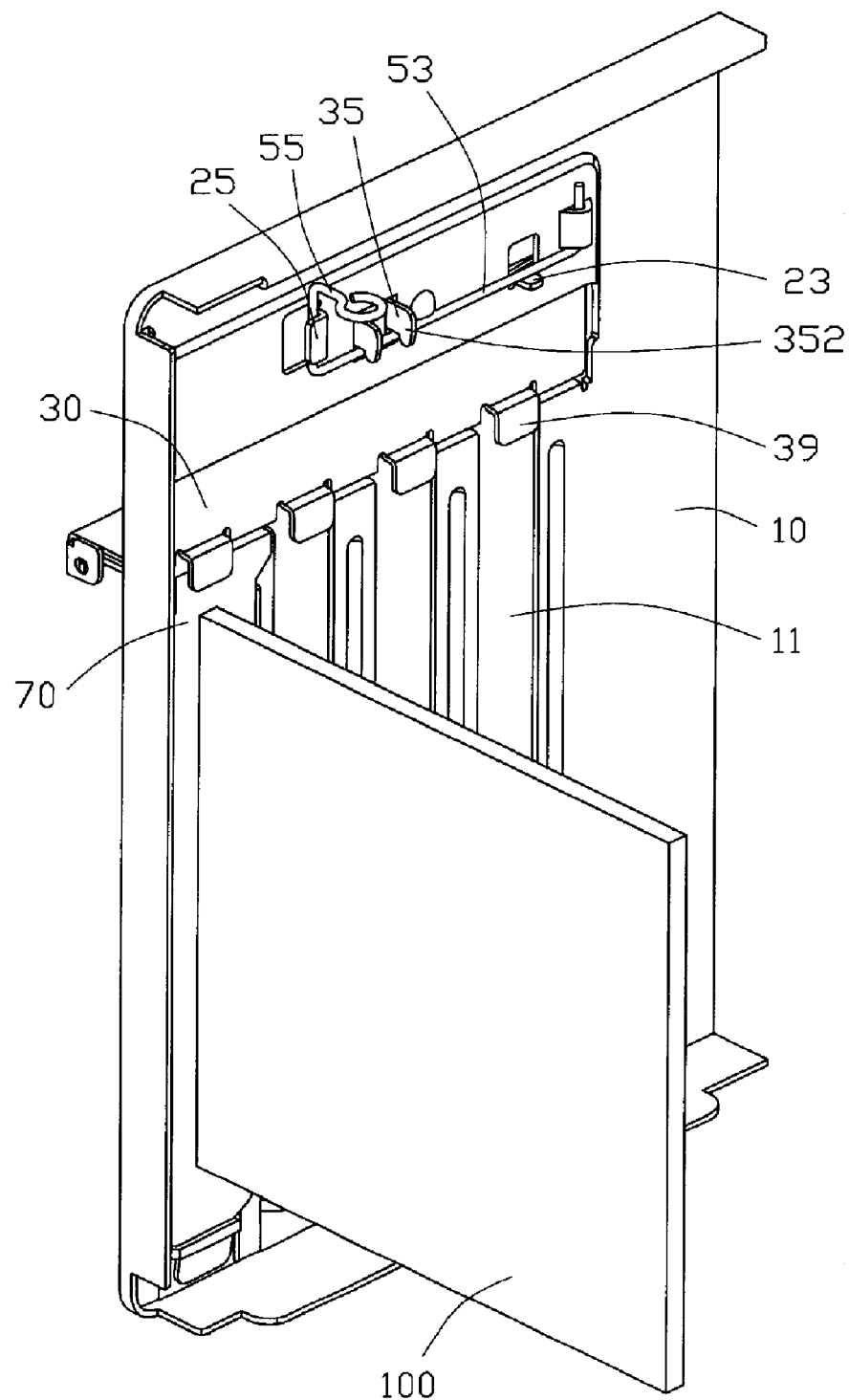
FIG. 3 is an assembled view of the retaining assembly of FIG. 1.

Referring also to FIG. 3, for retaining the fixing clip 70 of the card 100, the retaining member 30 is pivoted up. The fingers 39 of the retaining member 30 are rotated through the through opening 19 of the rear panel 10. At the same time, the catches 35 are rotated into the securing opening 29 of the rear panel 10. When an outer edge of the hook end 352 of each catch 35 abuts against the engaging portion 53 of the holding member 50, the engaging portion 53 is elastically deformed down until the catches 35 engage with the engaging portion 53 of the holding member 50. At this time, the resilient clips 37 abut against the rear panel 10 and deform back, thereby securing the retaining member 30 to the rear panel 10. The top flange 73 of the fixing clip 70 is pressed by the pressing portion 31 of the retaining member 30 on the supporting clip 15 of the rear panel 10. The fingers 39 of the retaining member 30 clamp the fixing clip 70 from an outer side. Thus the expansion card 100 is firmly secured to the rear panel 10.

In detaching the expansion card 100 from the rear panel 10, the operating portion 55 of the holding member 50 is pressed down until the engaging portion 53 of the holding member 50 is disengaged therefrom. Then the catches 35 of the retaining member 30 are released. The resilient clips 37 abut against the rear panel 10 and rebound to an original position. Consequently, the retaining member 30 is pivoted away from the rear panel 10 and disengages from the fixing clip 70. Then the expansion card 100 is thus detached from the rear panel 10.

Figure 4:
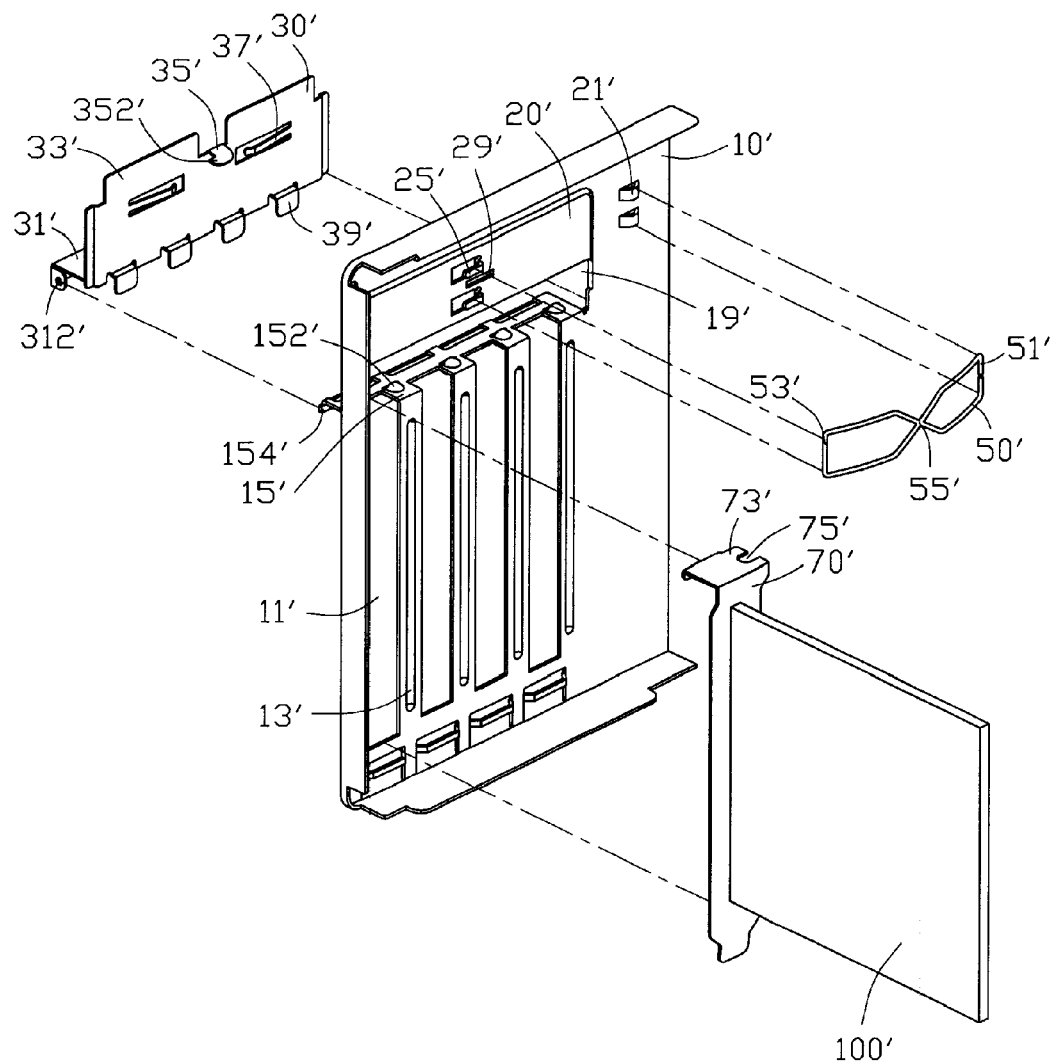
FIG. 4 is an exploded, isometric view of a retaining assembly for expansion cards of another preferred embodiment of the present invention, the retaining apparatus including a rear panel, a retaining member, an expansion card, and a holding member.

Referring to FIG. 4, a retaining apparatus for securing an expansion card 100' of another preferred embodiment of the present invention includes a rear panel 10', a retaining member 30', and a holding member 50'.

The rear panel 10' defines a plurality of fixing slots 11'. Every two adjacent fixing slots 11' are divided by a barrier 13'. A top portion of each barrier 13' is bent horizontally and defines a through opening 19' thereabove. A positioning tab 152' is formed on the supporting clip 15' above each barrier 13'. A pivot axis 154' is formed at the supporting clip 15'. A securing board 20' is defined on a top of the through opening 19'. A pair of holding tabs 21' each with a through hole therein protrudes from the securing board 20' for holding the holding member 50'. A rectangular securing opening 29' is defined in the securing board 20'. A pair of restricting hooks 25' with free ends pointing generally away from the holding tab 21' is formed on the securing board 20' for retaining the holding member 50'.

The retaining member 30' includes a pressing portion 31' and a side wall 33'. A pivot portion 312' extends from each of two opposite sides of the pressing portion 31' corresponding to the pivot axis 154' of the rear panel 10'. Each pivot portion 312' defines a pivot hole. A plurality of fingers 39' is bent vertically down from the pressing portion 31'. A catch 35' is bent from a top edge of the side wall 33' with an arcuate hook end 352' pointing towards a side of the retaining member 30' corresponding to the securing opening 29' of the rear panel 10'. A pair of resilient clips 37' is formed near the catch 35'.

The holding member 50' is formed of a resilient iron wire, and includes two securing ends 51', an engaging portion 53', and an operating portion 55'. The holding member 50' is generally lemniscate-shaped like an infinity sign (∞).

Figure 5:
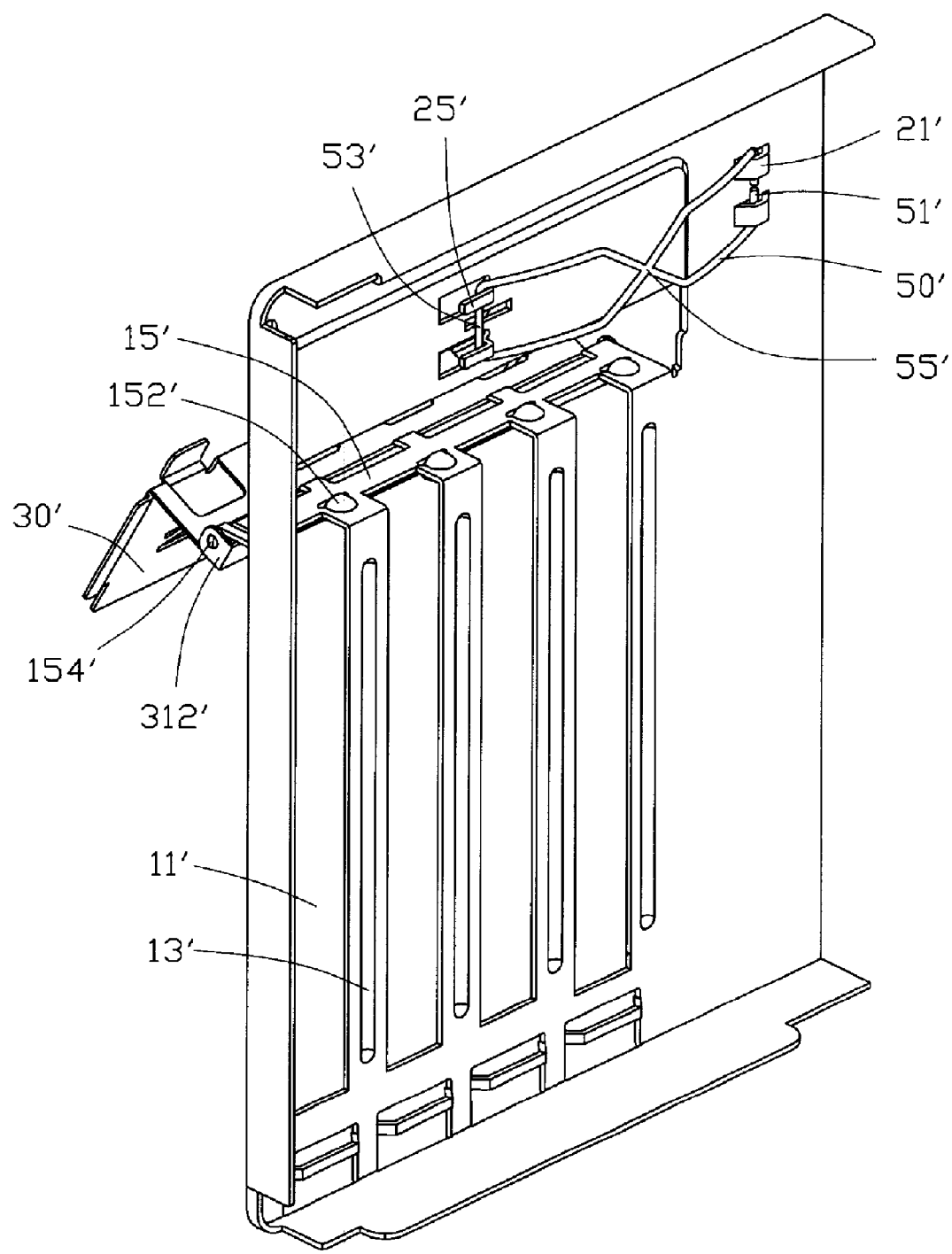
FIG. 5 is an assembled, isometric view of the retaining assembly of FIG. 4 without the expansion card.
Figure 6:
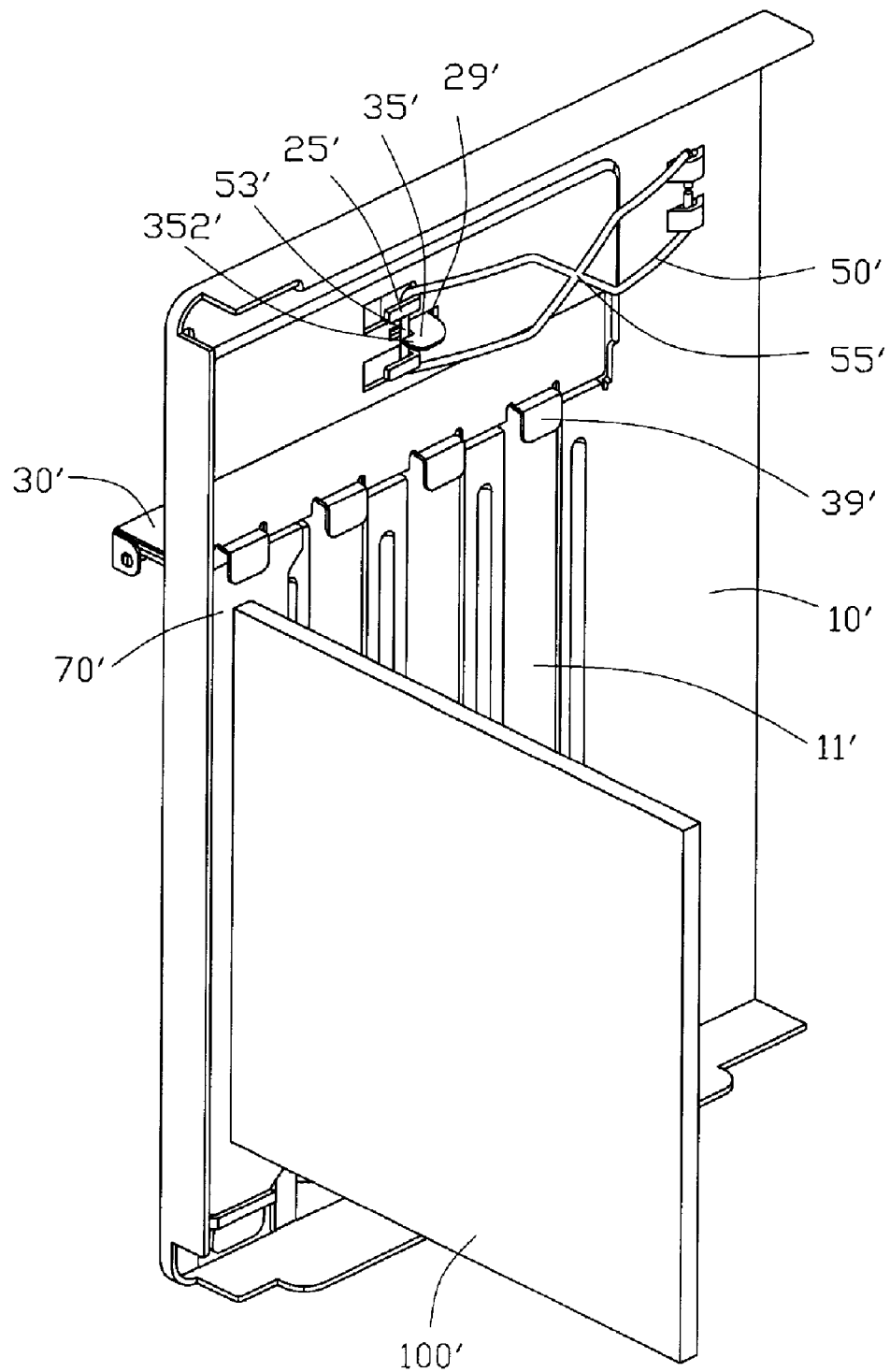
FIG. 6 is an assembled view of the retaining assembly of FIG. 4.

Referring also to FIG. 5 and FIG. 6, in retaining the fixing clip 70' of the expansion card 100', the retaining member 30' is pivoted up. The catch 35' is rotated into the securing opening 29' of the rear panel 10'. When an outer edge of the hook end 352' of the catch 35' abuts against the engaging portion 53' of the holding member 50', the holding member 55' is elastically deformed. The retaining member 30' is rotated to the rear panel 10', the resilient clips 37' abut against the rear panel 10' and deform backwards. The holding member 50' deforms back, and secures with the catch 35' of the retaining member 30'. Therefore, the retaining member 30' is secured to the rear panel 10'. The top flange 73' of the fixing clip 70' is pressed by the pressing portion 31'. The fingers 39' of the retaining member 30' clamp the fixing clip 70' from an outer side. The fixing clip 70' is thus firmly secured to the rear panel 10'.

In detaching the fixing clip 70' from the rear panel 10', the operating portion 55' of the holding member 50' is pressed down. The catch 35' of the retaining member 30' is released, when the engaging portion 53' of the holding member 50' disengages therefrom. The resilient clips 37' of the retaining member 30' rebound. Consequently, the retaining member 30' is pivoted away from the rear panel 10', and disengages from the fixing clip 70'. The fixing clip 70' is thus detached from the rear panel 10'.

It is to be understood, however, that even though numerous characteristics and advantages have been set forth in the foregoing description of a preferred embodiment, together with details of the structure and function of the preferred embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retaining apparatus for retaining a fixing clip of an expansion card to a computer, comprising:
   a panel, defining a fixing slot for receiving the fixing clip, a supporting clip bent from a surface of the panel;
   a retaining member pivotably seated on the supporting clip of the panel, the retaining member comprising a pressing portion, and a side wall generally perpendicular to the pressing portion, the side wall having a catch thereon; and
   a holding member attached to an opposite surface of the panel, the holding member comprising a resilient engaging portion, wherein when the retaining member is pivoted to abut against the panel, the catch extends through the panel and engages with the engaging portion of the holding member, thereby the fixing clip is sandwiched between the pressing portion of the retaining member and the supporting clip of the panel, wherein the holding member is formed of a wire.

2. The retaining apparatus as described in claim 1, wherein a pivot axis is formed at the supporting clip, and a pair of pivot portions is formed at the retaining member for receiving the pivot axis.

3. The retaining apparatus as described in claim 1, wherein at least a resilient clip is formed on the side wall of the retaining member for urging the retaining member to pivot away from the panel.

4. The retaining apparatus as described in claim 1, wherein a finger is formed on the retaining member for clamping the fixing clip from an outer side thereof.

5. The retaining apparatus as described in claim 1, wherein an end portion of the holding member is secured to the panel, and another portion of the holding member can be pressed for deforming the holding member.

6. The retaining apparatus as described in claim 1, wherein the holding member is generally lemniscate-shaped.

7. The retaining apparatus as described in claim 1, wherein the catch has an arcuate hook end for urging the holding member to deform.

8. An expansion card assembly, comprising:

a panel defining a fixing slot therein, a supporting clip bent from the panel;

an expansion card with a fixing clip thereon, the fixing clip received in the fixing slot of the panel;

a retaining member attached to the panel, the retaining member comprising a pressing portion and a side wall, the side wall having a catch thereon; and a resilient holding member attached to the panel, the holding member comprising an engaging portion, wherein when the retaining member abuts against the panel, the catch urges the engaging portion to deform, thereby the catch engaging with the engaging portion when the engaging portion rebounds, wherein the holding member is formed of a resilient wire.

9. The expansion card assembly as described in claim 8, wherein a pivot axis is formed at the supporting clip, and a pair of pivot portions is formed at the retaining member for receiving the pivot axis.

10. The expansion card assembly as described in claim 8, wherein a resilient clip is formed on the side wall of the retaining member for urging the retaining member to move away from the panel.

11. The expansion card assembly as described in claim 8, wherein at least a finger is bent from the retaining member clamping the fixing clip from an outer side thereof.

12. The expansion card assembly as described in claim 8, wherein the holding member is generally lemniscate-shaped.

13. The expansion card assembly as described in claim 8, wherein an arcuate hook end is formed on the catch for driving the holding member to deform when the retaining member engages with the holding member.

14. The expansion card assembly as described in claim 8, wherein the retaining member is attached to one side of the panel, and the holding member is attached to an opposite side of the panel.

15. An electronic device comprising:

a panel of said electronic device extending along a side of said electronic device to shield said side, said panel defining at least one slot therein;

a component removably installable in said electronic device beside at least one slot of said panel at a first side of said panel by means of attaching a clip of said component onto said panel in order to cover said at least one slot;

a retaining member attachably installable to said panel beside said at least one slot at a second side of said panel opposite to said fist side thereof, said retaining member movable at said second side of said panel to retain said clip as well as said component to said panel in a first position of said retaining member, and to release said clip as well as said component in a second position of said retaining member, said retaining member comprising a catch extending toward said panel, and extendable through said panel to said first side of said panel when said retaining member moves to said first position thereof; and a holding member movably attachable to said panel at said first side thereof, said holding member engagable with said catch at said first side of said panel to retain said retaining member in said first position thereof and disengagable from said catch to release said retaining member so as to allow said retaining member to move from said first position thereof to said second position thereof, wherein said holding member is formed of a resilient iron wire.

16. The electronic device of claim 15, wherein said holding member comprises an operating portion operable to urge said holding member to disengage from said catch.

17. The expansion card assembly as described in claim 8, wherein an end portion of the holding member is secured to the panel, and an other portion of the holding member can be pressed for deforming the holding member.

* * * * *